(12) United States Patent
Ferguson

(10) Patent No.: US 7,969,156 B2
(45) Date of Patent: Jun. 28, 2011

(54) METHOD AND APPARATUS FOR MONITORING A LOAD

(75) Inventor: Kevin Ray Ferguson, Dublin, OH (US)

(73) Assignee: Liebert Corporation, Columbus, OH (US)

( * ) Notice: Subject to any disclaimer, the term of this patent is extended or adjusted under 35 U.S.C. 154(b) by 716 days.

(21) Appl. No.: 12/045,262

(22) Filed: Mar. 10, 2008

(65) Prior Publication Data

US 2008/0238404 A1    Oct. 2, 2008

Related U.S. Application Data

(60) Provisional application No. 60/909,031, filed on Mar. 30, 2007.

(51) Int. Cl.
*G01R 31/08* (2006.01)
*G01R 19/00* (2006.01)
(52) U.S. Cl. ...................... 324/522; 324/76.11
(58) Field of Classification Search ............... 324/522, 324/76.11
See application file for complete search history.

(56) References Cited

U.S. PATENT DOCUMENTS

| | | | |
|---|---|---|---|
| 5,281,859 A | 1/1994 | Crane | |
| 5,424,903 A | 6/1995 | Schreiber | |
| 5,862,393 A | 1/1999 | Davis | |
| 6,410,994 B1 | 6/2002 | Jones et al. | |
| 6,445,087 B1 | 9/2002 | Wang et al. | |
| 6,608,406 B2 | 8/2003 | Bersiek | |
| 6,618,772 B1 | 9/2003 | Kao | |
| 6,711,613 B1 | 3/2004 | Ewing et al. | |
| 6,741,442 B1 | 5/2004 | McNally | |
| 6,744,150 B2 | 6/2004 | Rendic | |
| 6,826,036 B2 | 11/2004 | Pereira | |
| 6,937,461 B1 | 8/2005 | Donahue, IV | |
| 7,010,589 B2 | 3/2006 | Ewing et al. | |
| 7,043,543 B2 | 5/2006 | Ewing et al. | |
| 7,099,934 B1 | 8/2006 | Ewing et al. | |
| 7,141,891 B2 | 11/2006 | McNally et al. | |
| 7,162,521 B2 | 1/2007 | Ewing et al. | |

(Continued)

FOREIGN PATENT DOCUMENTS

EP    1081921    3/2001

(Continued)

OTHER PUBLICATIONS

C. Sidney Burns, et. al, An Introduction to Wavelets and Wavelet Transforms—A Primer, Prentice Hall, pp. 62, 205-207 (1998).

(Continued)

*Primary Examiner* — Amy He
(74) *Attorney, Agent, or Firm* — Locke Lord Bissell & Liddell LLP

(57) ABSTRACT

Applicants have created an improved method and apparatus for remotely monitoring an electrical load and assessing key attributes of power-related anomalies and line disturbances caused or created by the electrical load and qualifying their conformity to certain expected steady state conditions. The apparatus includes an intelligent power distribution module that can include a power output section, a power input section, a communication section, and related circuitry. The intelligent power distribution module can further include a memory section, a sensing device, a processing device, and a switch. The method for monitoring an electrical load having a current and voltage requirement supplied by an electrical source coupled to the load generally includes: interfacing a sensing module between the load and the electrical source; sensing one or more characteristics of the load; and determining the performance of the load sensing.

20 Claims, 4 Drawing Sheets

U.S. PATENT DOCUMENTS

| | | | |
|---|---|---|---|
| 7,171,461 B2 | 1/2007 | Ewing et al. | |
| 7,196,900 B2 | 3/2007 | Ewing et al. | |
| 7,268,998 B2 | 9/2007 | Ewing et al. | |
| 2003/0122683 A1 | 7/2003 | Downer | |
| 2004/0165358 A1 | 8/2004 | Regimbal et al. | |
| 2004/0178270 A1 | 9/2004 | Pradhan et al. | |
| 2005/0203987 A1 | 9/2005 | Ewing et al. | |
| 2005/0259383 A1 | 11/2005 | Ewing et al. | |
| 2008/0217471 A1* | 9/2008 | Liu et al. | 244/1 R |

FOREIGN PATENT DOCUMENTS

| | | |
|---|---|---|
| JP | 11108900 A | 4/1999 |
| JP | 2004325302 A | 11/2004 |
| WO | 9310615 | 5/1993 |
| WO | 0017728 A2 | 3/2000 |
| WO | 0069081 | 11/2000 |
| WO | 2005039016 A1 | 4/2005 |

OTHER PUBLICATIONS

Yves Nievergelt, Wavelets Made Easy, Birkhauser, pp. 58-60 (1999).

Barbara Burke Hubbard, The World According to Wavelets, AK Peters, pp. 30-33, 78-81 (1996).

Emmanuel C. Ifeachor, et. al., Digital Signal Processing—A Practical Approach, Addison-Wesley, pp. 184-190 (1990).

Norden E. Huang, Hilbert-Huang Transforms and Its Application, Chapter 1: Introduction to the Hilbert Huang Transform and Its Related Mathematical Problems, pp. 1-26 (2005).

G. Kerschen, A.G. Vakakis, Y.S. Lee, D.M. McFarland, and L.A. Bergman, Toward a Fundamental Understanding of the Hilbert-Huang Transform in Nonlinear Structural Dynamic, Journal of Vibration and Control, vol. 14, No. 1-2, 77-105, pp. 1-30 (2008).

Norden E. Huang, Hilbert-Huang Transform: A Method for Analyzing Nonlinear, NASA Medical Technology Summit, Pasadena, CA, pp. 1-38 (Feb. 23, 2003).

Ruqiang Yan and Robert X. Gao, A Tour of the Hilbert-Huang Transform: An Emperical Tool for Signal Analysis, IEEE Instrumentation & Measurement Magazine, pp. 40-45, vol. 10, No. 5, Oct. 2007.

Jorg Riegler, International Search Report for International Patent Application No. PCT/US2007/086810, European Patent Office, The Netherlands, dated Jan. 23, 2009.

Jorg Riegler, Written Opinion for International Patent Application No. PCT/US2007/086810, European Patent Office, Germany, dated Jan. 23, 2009.

Ellen Moyse, International Patent Report on Patentability for International Patent Application No. PCT/US2007/086809, The International Bureau of WIPO, Switzerland, dated Jun. 18, 2009.

Ellen Moyse, International Patent Report on Patentability for International Patent Application No. PCT/US2007/086810, The International Bureau of WIPO, Switzerland, dated Jun. 18, 2009.

B. Levine and A. Swales. "Wanted: IP addresses for factory network devices! & Software solution for industrial IP addressing tasks." The Industrial Ethernet Book, Jan. 2004, Issue 18.

G. Anastassiades, International Search Report for International Patent Application No. PCT/US2007/086809, European Patent Office, Germany, dated Jun. 9, 2008.

G. Anastassiades, Written Opinion for International Patent Application No. PCT/US2007/086809, European Patent Office, The Netherlands, dated Jun. 9, 2008.

Nazar Dino Mohammed, Signal filtering, wavelet transform, Hilbert-Huang transform. The date of the document is unknown, but being before the filing date of the patent application, that is before, Mar. 10, 2008.

International Search Report for International Patent Application No. PCT/US2007/086809.

Written Opinion for International Patent Application No. PCT/US2007/086809.

Bernhard Krasser, International Search Report for Corresponding International Patent Application No. PCT/US2008/056787, European Patent Office, Germany.

Bernhard Krasser, Written Opinion for Corresponding International Patent Application No. PCT/US2008/056787, European Patent Office, Germany.

Lechner, M., written opinion for Singapore patent application No. 200904881-0, Intellectual Property Office of Singapore, serv.ip—a company of the Austrian Patent Office, mailed Jan. 11, 2011.

* cited by examiner

METHOD AND APPARATUS FOR MONITORING A LOAD

CROSS REFERENCE TO RELATED APPLICATIONS

This application claims the benefit of U.S. Provisional Application Ser. No. 60/909,031 filed Mar. 30, 2007, which is incorporated by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to monitoring a load in a power distribution system; and, more specifically, relate to a method and apparatus for remotely monitoring a load in a power distribution system adapted to validate the performance of a load sensing in an apparatus.

2. Description of the Related Art

In order to provide background information so that the invention may be completely understood and appreciated in its proper context, reference may be made to a number of prior U.S. patents as follows:

U.S. Pat. No. 5,281,859 to Crane, issued Jan. 25, 1994, discloses an "automatically switched power receptacle," in which a switched power circuit selectively connects an electrical load to any one of a plurality of branch power circuits. The switched power circuit includes a sensing circuit for sensing electrical loading on each of the branch circuits. A logic circuit is coupled to the sensing circuit for selecting one of the branch circuits to be connected to the load according to the sensed loading to provide balanced loading on each branch circuit.

U.S. Pat. No. 5,424,903 to Schreiber, issued Jun. 13, 1995, discloses an "intelligent power switcher," in which an intelligent power switching system is disclosed for controlling the electrical connection of a power source to each of a plurality of outputs, such as personal computers components or electronic entertainment equipment. Switch circuitry is coupled to relay circuitry for generating signals responsive to user commands to select an "on" or "off" state with respect to each output.

U.S. Pat. No. 5,862,393 to Davis, issued Jan. 19, 1999, discloses a "system for managing power of a computer with removable devices." The patent discloses a system for managing power consumption by communicating power management events to a removable device of the computer. In response to a power management event, a device removal signal is transmitted to a device controller for the removable device while the device is installed within a socket of a computer. This device removal signal can provide notice of a power state change for the device, such as the interruption of electrical power to that device. The power state change is communicated by the device controller to a device driver in response to the device removal signal. Electrical power to the device is terminated in response to the power management event. Additionally, a device insertion signal is transmitted to the device controller in response to another power management event and while the device remains installed within the socket. This device insertion signal provides notice of another state change for the device. Electrical power is reapplied to the device in response to this power management event.

U.S. Pat. No. 6,618,772 to Kao et al., issued Sep. 9, 2003, discloses a "method and apparatus for selecting, monitoring, and controlling electrically powered devices." In one embodiment, the apparatus includes an electrically powered device having a key operating line and switching control circuitry to control usage of the electrically powered device by interrupting continuity of the key operating line.

U.S. Pat. No. 6,741,442 to McNally, issued May 25, 2004, discloses an "intelligent power distribution system," which discloses one or more intelligent power strips. The power strips can each include an elongated housing that may be adapted for mounting in an equipment rack. The power strips further include power management circuitry that can power-on and power-off the power outlets in accordance with an operator defined sequence and delays. The power management circuitry can further sense electrical current drawn by the power strip and control operation of the power strip based on the sensed electrical current to minimize branch circuit breaker tripping.

U.S. Pat. No. 6,744,150 to Rendic, issued Jun. 1, 2004, discloses an "outlet strip controlled by PC using low voltage powertap." The patent discloses an improved electrical power strip which will automatically energize or de-energize one or more devices which are plugged into the strip, upon receiving an electrical signal from the primary device, without need for manual actuation of a switch on the electrical strip or an under monitor system by the user. The system uses a low voltage power tap connector which is plugged in any appropriate socket of the primary device (which may be a personal computer) to sense the primary status of the power supply. The output signal triggers a synchronous transfer switch or relay which enables power to secondary devices, permitting them to be synchronously turned on or off depending on the computer status.

U.S. Pat. No. 6,937,461 to Donahue, IV, issued Aug. 30, 2005 discloses a "modular power distribution unit, module for the power distribution unit, and method of using the same." The patent discloses a modular power distribution unit for supplying electric power to attached equipment in environments such as data centers, computer rooms, and communication centers, where power requirement for attached equipment may vary. The power distribution unit includes a frame and one or more user-replaceable power modules, which fit into slots in the frame. Each power module provides one or more plug receptacle types, receptacle numbers, and power rating configuration to accommodate various equipment in a particular environment, as needed. The power modules may be removed, installed and interchanged in the frame without interrupting power to other modules or to the power distribution unit.

None of the references teaches solving the above patent problem, that is remotely measuring and detecting and qualifying certain power-related anomalies or line disturbances caused or created by the electrical loads and validating the performance of the electrical load sensing in the apparatus. There remains then a need for proper and accurate measuring of the power-related signals of the electrical loads, current levels and/or voltage levels and calibration of the same in a remote fashion and while the loads are still operative.

The inventions disclosed and taught herein are directed to a method and apparatus for monitoring a load.

BRIEF SUMMARY OF THE INVENTION

Applicants have created an improved method and apparatus for remotely monitoring an electrical load and assessing key attributes of power-related anomalies and line disturbances caused or created by the electrical load and qualifying their conformity to certain expected steady state conditions. The disclosure provides a means for validating the performance, including, but not limited to, the accuracy and validity, of the load sensing in the apparatus. The apparatus includes an intelligent power distribution module that can include a power output section, a power input section, a communication section, and related circuitry. The intelligent power distribution module can further include a memory section, a sensing device, a processing device, and a switch.

The disclosure also provides a method for monitoring an electrical load having a current and voltage requirement supplied by an electrical source coupled to the load, generally including interfacing a sensing module between the load and the electrical source, sensing one or more characteristics of the load, and determining the performance, including, but not limited to, accuracy and validity, of the load sensing.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
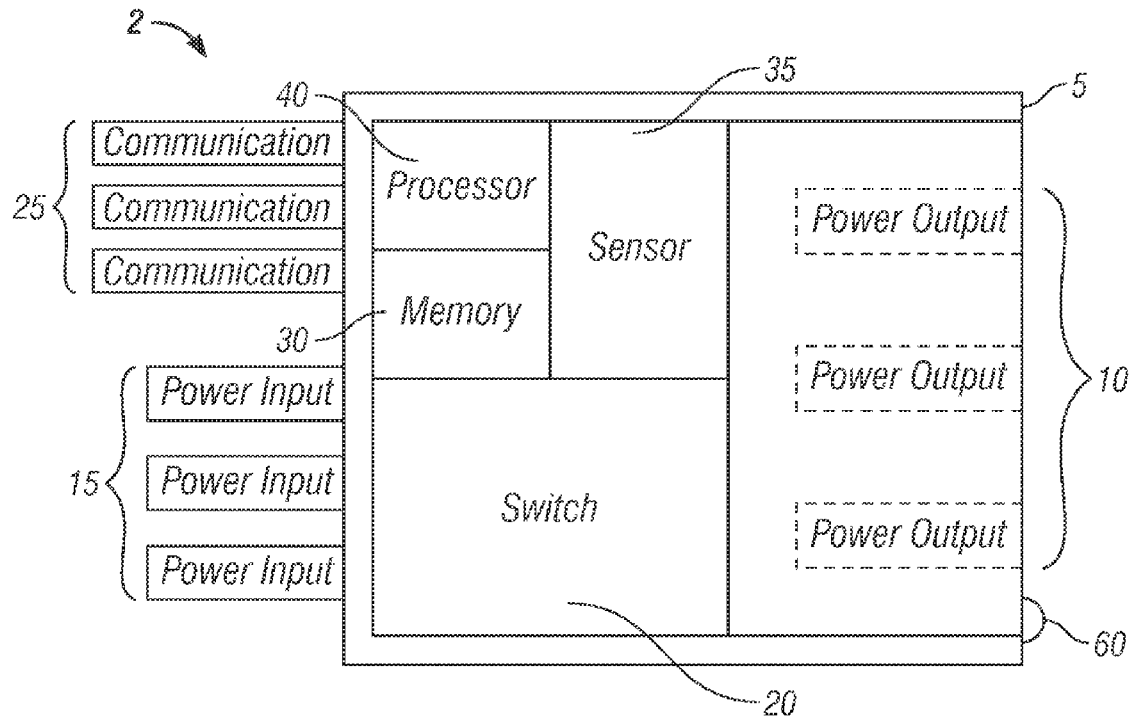
FIG. 1 illustrates an exemplary embodiment of the intelligent power distribution module.

While the invention disclosed herein is susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed descriptions are provided to illustrate the inventive concepts to a person of ordinary skill in the art and to enable such person to make and use the inventive concepts.

DETAILED DESCRIPTION

The Figures described herein and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill this art having benefit of this disclosure. It must be understood that the inventions disclosed and taught herein are susceptible to numerous and various modifications and alternative forms. Lastly, the use of a singular term, such as, but not limited to, "a," is not intended to limit the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created an improved method and apparatus for remotely monitoring an electrical load, remotely analyzing power-related anomalies and line disturbances of an electrical load and validating the performance of the sensing device. The apparatus includes an intelligent power distribution module that can include a power output section, a power input section, a communication section, and related circuitry. The module can further include a memory section, a sensing-device, a processing device, and a switch. The method for monitoring an electrical load having a current and voltage requirement supplied by an electrical source coupled to the load generally includes: interfacing a sensing module between the load and the source for sensing one or more characteristics of the load; analyzing power-related anomalies and line disturbances caused or created by the electrical load; sensing one or more characteristics of the load; and determining the performance, including, but not limited to, accuracy and validity, of the load sensing.

A power module can receive electrical power from a power input section and route the power through a switched device to a power output section to a load. The intelligent power distribution module 2 of the present disclosure is an improvement on prior art modules. The intelligent power distribution module 2 in an exemplary embodiment allows users to automatically calibrate and determine the performance, including, but not limited to, accuracy and validity, of the load sensing of the intelligent power distribution module 2. There are various types of intelligent power distribution modules 2 each having different configurations to meet customers' demands. For example, the intelligent power distribution modules may have different power ratings, different power receptacles, different sensing-devices, or plugs. Load sensing can include sensing, including measuring, signals or characteristics anywhere in the apparatus, and/or anywhere between the power input and the load connected to the apparatus—including, but not limited to, monitoring the load in the apparatus, monitoring the apparatus or monitoring the sensing device in the apparatus. The load sensing can be embodied by a variety of sensing systems, including sensing device 35, which is described in more detail below.

FIG. 1 illustrates an exemplary embodiment of the intelligent power distribution module. The intelligent power distribution module generally includes: a power output section 10, a power input section 15, a communication section 25 and related circuitry, which generally includes a memory section 30, a sensing device 35, a processing device 40, and switch 20 adapted to determine the performance, including, but not limited to, accuracy and validity, of the load sensing. The various elements will be described in more detail below.

The input power section 15 is a connection device adapted to connect with and receive electrical power from a power source 50. Further details are shown and described in FIGS. 2-5. The power sources used in a power distribution system utilizing the intelligent power distribution module 2 can include, for example, an electrical power wall socket, an electrical power rail, an electrical power strip, a branch circuit monitoring system ("BCMS"), or a Liebert distributed monitoring system ("LDM"). The input power section 15 may be embodied by any power plug, such as a safety agency recognized standard power plug, for example, a National Electrical Manufacturers Association ("NEMA") 5-15P or NEMA L5-20P. In the embodiment illustrated in FIG. 1, the power output section 15 is shown to have the dimensional and electrical specifications of a NEMA 5-15P plug. The intelligent power distribution module 2 may be configured to have one or more power input sections 15.

The related circuitry generally includes a memory section 30, a sensing device 35, a processing device 40, and a switch 20 and is adapted to determine the performance, including, but not limited to, accuracy and validity, of the load sensing. The memory section 30 may be embodied by any number of storage devices. Without limitation, the memory section 30 can be electrically erasable programmable read-only memory. The memory section 30 is adapted to store data. This data could include, for example, reference data, current levels, power consumption, or communications from other components in the power distribution system.

The sensing device 35 comprises a current-sensing and/or a voltage-sensing device adapted to sense current or voltage from the power input section. The sensing device 35 can be a current transducer. The sensing device 35 may provide, for example, the data for the intelligent power distribution device to automatically calibrate and determine the performance, including, but not limited, accuracy and validity, of the load sensing.

The processing device 40 is a device adapted to control the intelligent power distribution module including, for example, controlling various functions of the sensing and/or monitoring functions. The processing device 40, for example, can calculate values used in calibrating and determining the performance, including, but not limited, accuracy and validity, of the load sensing. The intelligent power distribution module 2 comprises a display 60 indicating the status of the module. This display, for example, can display that data has been sent, the module is calibrating, the module needs to be replaced, or a power quality problem is evident.

The communication section 25 is a device adapted to transmit data to and from the intelligent power distribution module 2. The communication section 25 may communicate, for example, by wired or wireless signals. In the embodiment illustrated in FIG. 1, the communication section 25 is a wired communication bus. The communication section 25 may communicate in a number of ways. Three examples are offered and other ways are available. First, the communication section 25 may communicate over the electrical pathway from the power source 15. Second, the communication section may communicate over a dedicated wired communication signal, such as a bus. Third, the communication section may communicate over a wireless signal with a remote station, for example, with the power source or some other component of the power distribution system.

The power output section 10 is a connection device adapted to connect with and transfer electrical power to one or more loads 45. Further details are shown and described in FIGS. 2-5. The power output section 10 may be embodied by any power receptacle, such as a safety agency recognized standard power receptacle, for example, a NEMA 5-15R or an IEC 60320-2-2-Sheet F (C13) outlet. In the embodiment illustrated in FIG. 1, the power output section 10 is shown to be a cross section of a C13 outlet. The intelligent power distribution module 2 can be configured to have one or more power output sections 10.

FIGS. 2-5 illustrate the intelligent power distribution module 2 and exemplary variations in a power distribution system. These figures will show a few illustrations of the many different embodiments of intelligent power distribution modules 2 and related systems.

Figure 2:
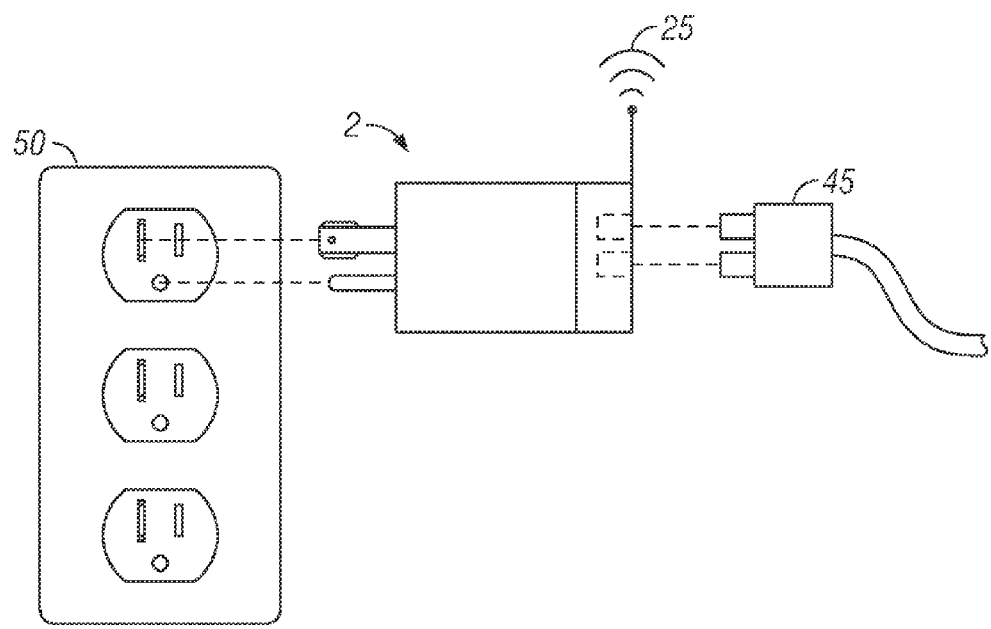
FIG. 2 illustrates the intelligent power distribution module in an intelligent power distribution system.

FIG. 2 illustrates the intelligent power distribution module in an intelligent power distribution system. The system includes an electrical power source 50, illustrated here as a power strip, connected to an intelligent power distribution module 2, and an electrical power load 45, illustrated here as a NEMA 5-15P plug, connected to the intelligent power distribution module 2. In this embodiment, the communication section 25 is wireless. The wireless communication section 25 allows the intelligent power distribution module 2 to wirelessly transmit and receive data from and to the intelligent power distribution module 2. The wireless communication section can transmit data, for example, one or more characteristics of the load sensing or of a module, from or to a remote location. A remote location can include, for example, another intelligent power distribution module or any other system.

Figure 3:
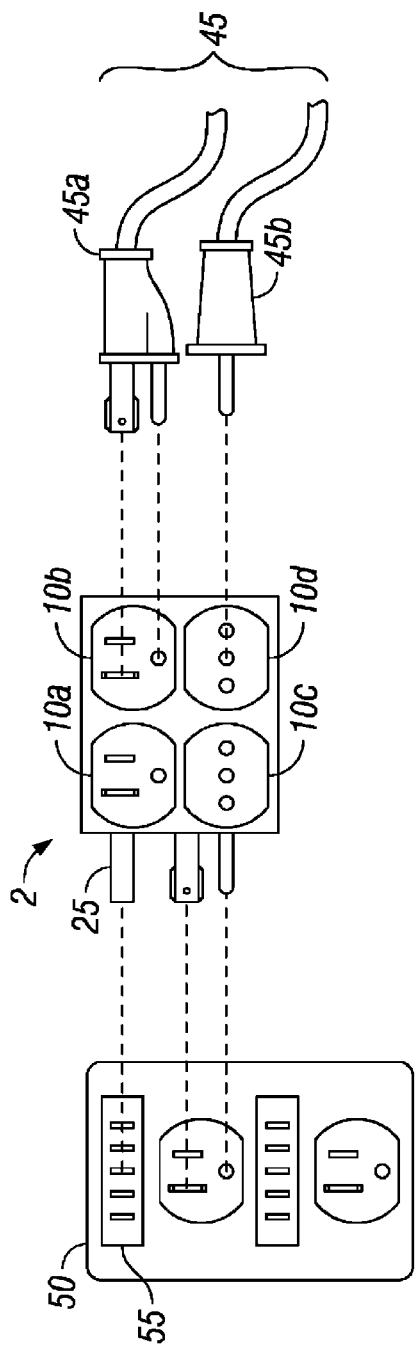
FIG. 3 illustrates another embodiment of the intelligent power distribution module in an intelligent power distribution system.

FIG. 3 illustrates another embodiment of the intelligent power distribution module in an intelligent power distribution system. The system includes an electrical power source 50, illustrated here as a power rail, connected to an intelligent power distribution module 2, and multiple electrical power loads 45a and 45b, illustrated here as a combined dual set of NEMA 5-15P and a plug interface with a customized contact arrangement, connected to the intelligent power distribution module 2.

In this embodiment, the intelligent power distribution module 2 includes a wired communication section 25 and multiple electrical power output sections, 10a, 10b, 10c and 10d (collectively "10"). FIG. 3 illustrates how the intelligent power distribution module 2 can transfer energy to multiple and different types of loads 45a and 45b (collectively "45"). The power source 50, embodied here as a power rail, includes a wired communication receptacle 55. The intelligent power distribution module 2 has a plurality of electrical power output sections 10 and thus can handle a plurality of loads 45. The intelligent power distribution module 2 has the ability to communicate via a wired communication section with an electrical power source 50.

Figure 4A:
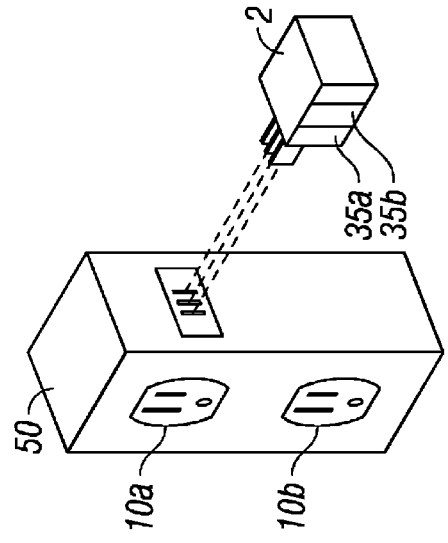
FIG. 4A illustrates another embodiment of the intelligent power distribution module in an intelligent power distribution system
Figure 4:
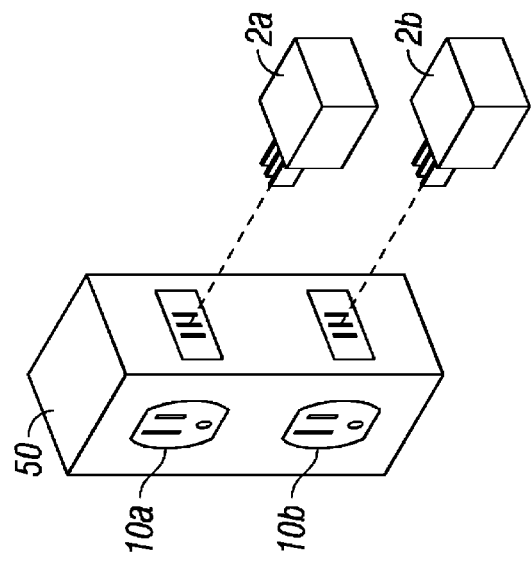
FIG. 4 illustrates another embodiment of the intelligent power distribution module in an intelligent power distribution system.

FIG. 4 illustrates another embodiment of the intelligent power distribution module in an intelligent power distribution system. The system includes an electrical power source 50, illustrated here as a power rail with the ability to connect to two intelligent power distribution modules 2a and 2b (collectively "2"). The intelligent power distribution modules 2a and 2b in this embodiment plug directly into the power source, as do the loads. The intelligent power distributions modules 2 can still perform their functions, for example, automatically calibrating and determining the performance, including, but not limited to, accuracy and validity, of the one or more characteristics of the load sensing, even though the loads 45, such as is shown in FIG. 3, are connected to the power strip 50 and not to the power output sections 10 of the intelligent power distribution modules 2.

FIG. 4A illustrates another embodiment of the intelligent power distribution module in an intelligent power distribution system. This alternative embodiment, similar to the embodiment shown in FIG. 4, may be illustrated by only one intelligent power distribution module 2 connected to the power strip with a plurality of power input sections, shown here as 10a and 10b, which can connect to a plurality of loads 45. The intelligent power distribution module 2 embodied in this illustration is responsible for multiple loads. The intelligent power distribution module 2 can perform its functions, for example, automatically calibrating and determining the performance, including, but not limited to, accuracy and validity, of one or more characteristics of the load sensing by the multiple sensing devices 35 of intelligent power distribution module 2, even though the loads 45 are connected to the power strip 50 and not to the power output sections 10 of intelligent power distribution module 2. In FIG. 4A, multiple sensing devices 35a and 35b of the intelligent power distribution module 2 sense the one or more characteristics of multiple loads 45, whereas the embodiment in FIG. 4 of the intelligent power distribution device only senses one load 45. This embodiment can be used in a branch circuit monitoring system ("BCMS") or a Liebert distributed monitoring system ("LDM"). More information on the BCMS and LDM may be found on Liebert Corporation's website, http://www.liebert.com/.

In one embodiment, the current can be measured remotely. In another embodiment, the current accuracy can be measured and used to calibrate the signals at the operator's discretion. In yet another embodiment, the current accuracy can be measured and used to calibrate the signals automatically.

The improved method created by the applicant is a method for monitoring an electrical load having a current and voltage requirement supplied by an electrical source coupled to the load generally including: interfacing the module between the load and the source for sensing one or more characteristics of the load; and sensing one or more characteristics of the load; and determining the performance, including, but not limited to, accuracy and validity, of the load sensing. The method can further include analyzing the power-related anomalies and line disturbances caused or created by the electrical load and validating the performance of the load sensing.

Figure 5:
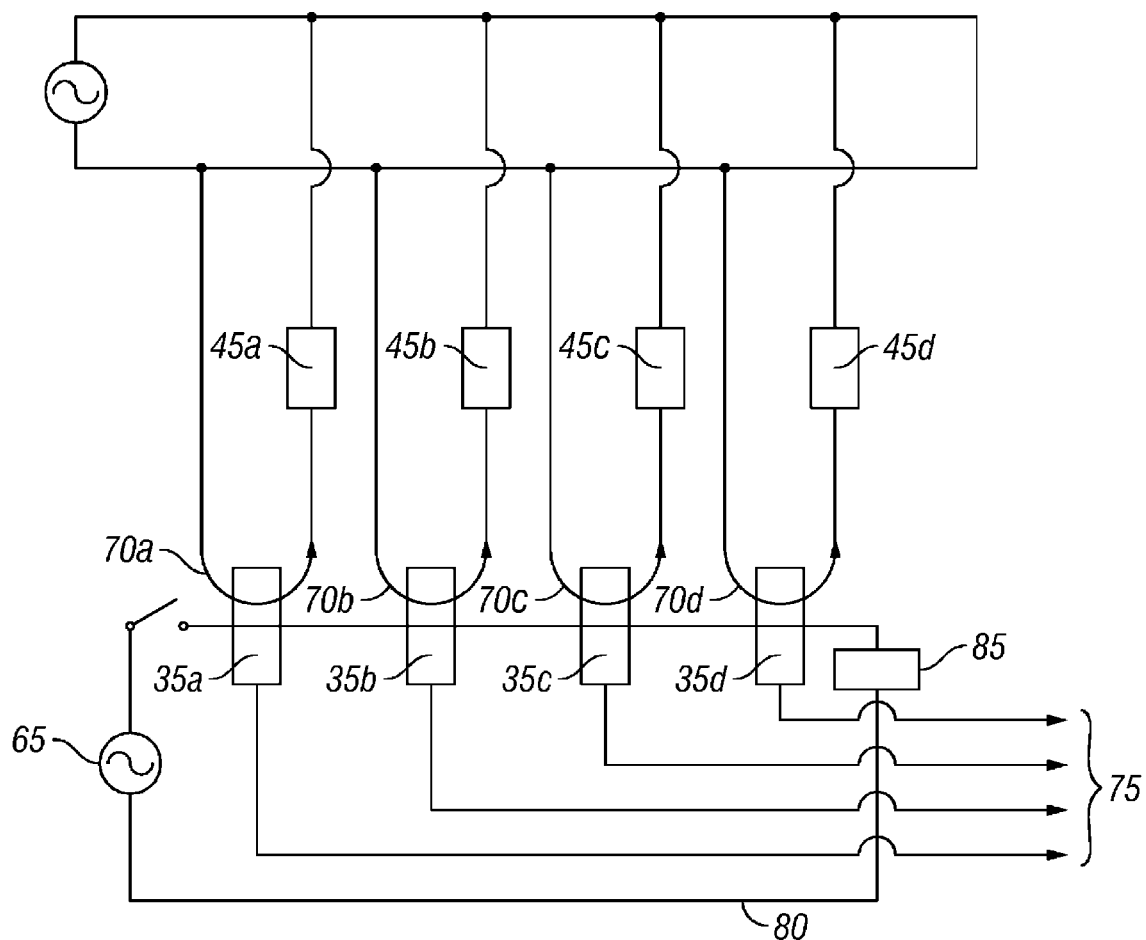
FIG. 5 is an exemplary systematic diagram illustrating determining the accuracy of results from monitoring an electrical load.

FIG. 5 illustrates an embodiment for monitoring a load, which further comprises calibrating the module to measure one or more characteristics of the load. In this embodiment, a plurality of sensing devices 35, shown in this embodiment as 35a, 35b, 35c, and 35d (collectively "35"), are interfaced between an electrical load and the source for sensing one or more characteristics. The sensing devices 35 can be coupled to at least one module 2. The electrical load has a current and voltage requirement from a power source and the characteristic to be measured is current. The sensors shown in FIG. 5 are therefore current sensing devices such as current transformers that transduce the change in magnetic fields at different current flow rates as a voltage change across a burden resistor, however, other types of sensors may be used in other embodiments. The four sensing devices 35 are sensing the one or more characteristics, 70a, 70b, 70c, and 70d, of four loads 45a, 45b, 45c, and 45d. Additionally a current source 65 is interfaced to a wire 80 that is routed through each sensing device 35 and terminated to a load 85. A burden resistor may be placed at the output of the current sensing device 35.

Figure 6:
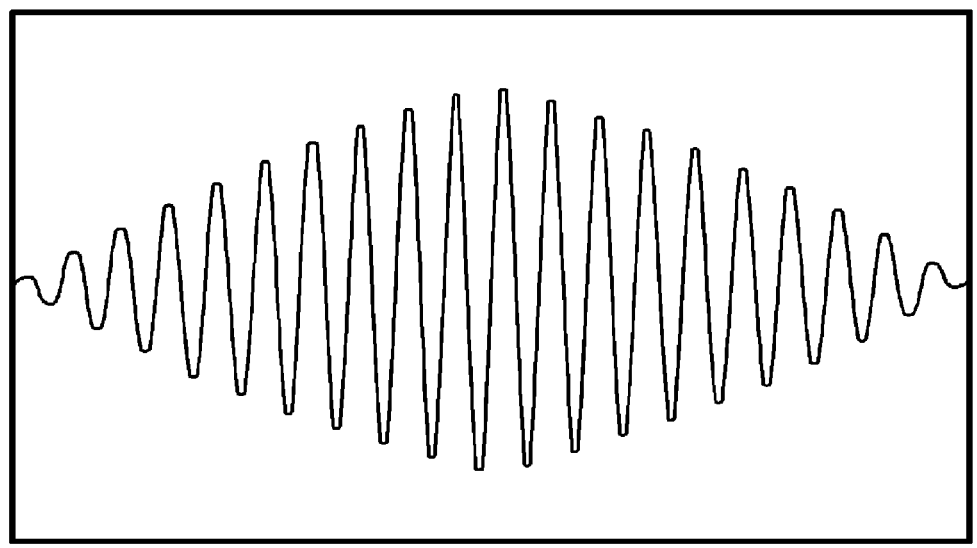
FIG. 6 illustrates an embodiment of the calibration waveform.

To calibrate the module to provide normative measurement information or validate one or more characteristics of the load sensing, the current source 65 outputs a calibrating current signal. For example, and without limitation, a calibrating current signal with a tapered sinusoidal form with a characteristic attack, stationary, and decay periods of an operating frequency greater than an order of magnitude of the load line frequency. Other calibrating current signals can be used having different waveform construct. The calibrating current signal is injected into the wire 80 that may be wound one or more times around the current sensing device. In another exemplary embodiment, the calibrating current signal may be so construed in waveform shape to mimic the features of the actual line disturbances or artifact to be detected. FIG. 6 illustrates an embodiment of the calibration waveform. In yet another exemplary embodiment, the waveform characteristics of the calibrating signal is such that it is unlikely the current signal of the load would contain similar perturbations during its normal operation caused by transient or quasi-stationary artifact. The methods may be applied while the load is disconnected to establish reference or normative measurement conditions or while the load is connected to calibrate operational data to the normative data. The methods disclosed herein may be used for accurate analysis of linear and stationary waveform data perturbed by well-defined transients. Other methods exist, such as Hilbert-Huang Transform, which may allow analysis of non-linear, non-stationary waveform data through the use of an adaptive basis to filter the signal. The following reference may provide additional details on the Hilbert-Huang Transform: Norden E. Huang, Hilbert-Huang Transforms and Its Application, Chapter 1: Introduction to the Hilbert-Huang Transform and its Related Mathematical Problems, pages 1-26 (2005); G. Kerschen, A. F. Vakakis, Y. S. Lee, D. M. McFarland, L. A. Bergman, Toward a Fundamental Understanding of the Hilbert-Huang Transform in Nonlinear Structural Dynamic, Journal of Vibration and Control, Vol. 14, No. 1-2, 77-105, pages 1-30 (2008); Norden Huang, Hilbert-Huang Transform: A Method for Analyzing Nonlinear, NASA Medical Technology Summit, Pasadena, Calif., pages 1-38 (Feb. 23, 2003).

Using common nomenclature for wavelet theory, a brief description with particularity of application to this invention follows. The following reference may provide additional details on common wavelet theory nomenclature: (i) C. Sidney Burrus, et al, An Introduction to Wavelets and Wavelet Transforms—A Primer, Prentice Hall, pages 62, 205-207 (1998); (ii) Yves Nievergelt, Wavelets Made Easy, Birkhauser, pages 58-60 (1999); (iii) Barbara Burke Hubbard, The World According to Wavelets, A K Peters, pages 30-33, 78-81 (1996); or (iv) Emmanuel C. Ifeachor, et al, Digital Signal Processing—A Practical Approach, Addison-Wesley, pages 184-190 (1993).

Figure 7:
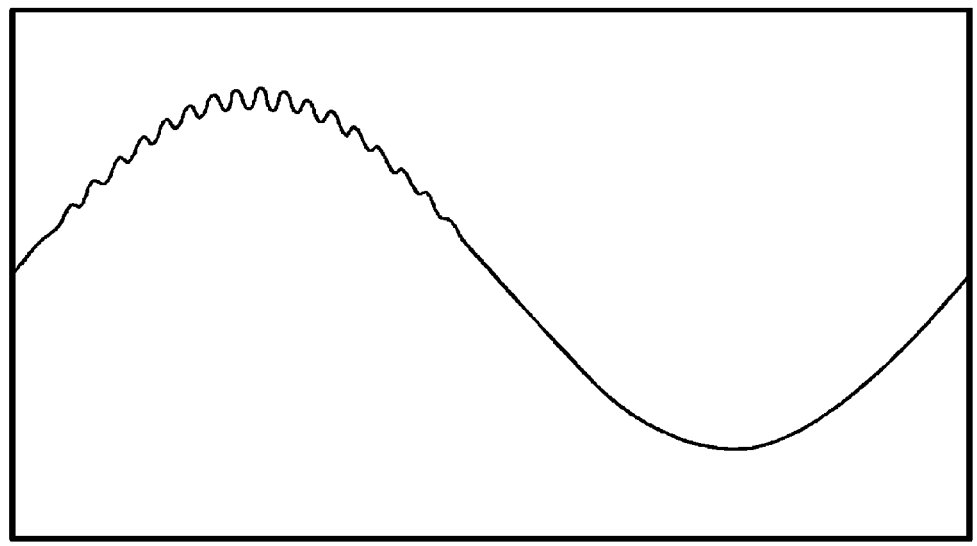
FIG. 7 illustrates an embodiment of a superposition waveform.

Once current source 65 produces a calibrating current signal, a phase-locked loop (PLL) controlled sampling system is established to digitize the current signal 75 for sample 2N equally spaced samples over at least a single integral period T of the line frequency. The calibration current signal is therefore linearly imposed on the current signal of loads 45a, 45b, 45c, and 45d, and the resultant voltage potential developed across the burden resistor is measured by the processing system and current sensing devices. FIG. 7 illustrates an embodiment of the superimposed waveform as shown below at one-fourth period T.

The $2^N$ equally spaced samples are measured over at least a single integral period T of the line frequency. A continuous wavelet transform is performed over this interval by convolving the sample set with a suitable wavelet and scaling function exhibiting similar waveform shape to the current calibration signal for highest sensitivity to matching error. The sample set is transformed or decomposed into an ordered set consisting of its average value and 2N−1 wavelet coefficients whose magnitudes approximate the proportional harmonic content of the original signal. A continuous wavelet transform is desirable because of its time shift invariant properties which make the coefficients less susceptible to the sample interval start of the decomposition process.

A continuous wavelet transform is repeated over N integral periods T of the line frequency so that a long-term mean value of coefficients may be calculated and converge to stable values. The resultant mean valued coefficient set is correlated with the reference or normative coefficient set measured over quiescent conditions by the same current sensing device 45 without current load. It may be necessary to discard the lower frequency coefficients that can be influenced by the lower-frequency content of the load current signal by using a hard or soft thresholding technique. A cross-correlation, e.g. digital matched filtering, or average magnitude cross-difference, or other similar correlation analysis is performed for the equal length sequences of coefficient pairs to validate the relative accuracy of the measuring system indicated by their residual differences. Because the calibration current signal is enabled at precisely the same phase of the cycle and due to the time shift invariant properties of the continuous wavelet transform, the cross-correlation will not have to be computed for difference lags in order to establish the largest correlation value.

The sensor's or measurement system's original accuracy specification may change due to component parametric changes from temperature, aging, or failure. A non-zero residual error between the expected and actual correlation coefficient is an indication of deviation from the original accuracy specification of the system's current signal, so this information allows for compensatory scaling effects to correct for the error and/or provides a signaling means for event detection. The system provides for either an internal or an external means for the generation of the calibration signal. As described above, FIG. 5 illustrates only an exemplary embodiment for monitoring a load whereby the measurement and calibration can be made.

In one embodiment of the method for monitoring a load, the method can measure one or more characteristics of the load. One or more characteristics of the load can include, for example, voltage, current and/or power. Further, one or more characteristics of the load can include other conditions, for example, the temperature of the load or the surrounding environment. In another embodiment, one or more characteristics of the module, for example, temperature, can be measured and communicated to a remote location. In yet another embodiment, the module can calibrate the module to determine whether the measured values of one or more characteristics of the load are being accurately measured. Calibrating ensures the accuracy of the measuring of the one or more characteristics of the load. The calibrating procedure or method may be performed in any number of ways and with a number of different waveform constructs.

Other and further embodiments utilizing one or more aspects of the inventions described above can be devised without departing from the spirit of Applicant's invention. For example, embodiments incorporating one or more aspects of the invention disclosed herein may be used comprising any number or different type of electrical power sources or loads without affecting the function or purpose. Additionally, any number of other methods may be used for measuring the one or more characteristics of the load or for calibrating the module to measure the one or more characteristics of the load. Further, the various methods and embodiments of the improved method and apparatus can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. An intelligent power distribution module, comprising:
a power input section adapted to connect with and receive electrical power from a source;
a circuitry receiving power from the power input section and comprising
a memory section, a power-related sensing device, and a processing device; wherein at least the processing device is adapted to determine the performance of the power-related sensing device;
wherein the circuitry is adapted to combine a calibrating current or voltage signal into an electrical signal of the power distribution module to create a combined signal; measure one or more characteristics of a load; and determine the performance of the load sensing;
wherein the circuitry is adapted to apply a mathematical transform to the combined signal in the module;
a power output section coupled to the circuitry and adapted to connect with and transfer electrical power to one or more loads; and
a communication section adapted to transmit data to and from the intelligent power distribution module.

2. The module of claim 1, wherein the mathematical transform comprises a wavelet transform.

3. The module of claim 2, wherein the sensing device is a current sensing device.

4. The module of claim 3, wherein the circuitry is adapted to calibrate the sensing device.

5. The module of claim 4, wherein the circuitry is adapted to measure one or more characteristics of the load sensed by the sensing device.

6. The module of claim 5, wherein the circuitry is adapted to automatically calibrate the sensing device.

7. The module of claim 6, comprising a display indicating the status of the module.

8. A method for monitoring an electrical load having a current and voltage requirement supplied by an electrical source coupled to the load, comprising:
interfacing a sensing module between the load and the electrical source for sensing one or more characteristics of the load;
combining a calibrating current or voltage signal with an electrical signal into a combined signal;
applying a mathematical transform to the combined signal in the sensing module;

measuring one or more characteristics of the load using the combined signal; and determining the performance of the sensing of one or more characteristics of the load.

9. The method of claim 8, wherein applying a mathematical transform comprises applying a wavelet transform to the combined signal in the sensing module.

10. The method of claim 8, wherein the calibrating signal is a tapered sinusoidal form with a characteristic attack, stationary, and decay periods of operating frequency greater than an order of magnitude of a line frequency of the load.

11. The method of claim 10, further comprising communicating the characteristics of the load to a remote station.

12. The method of claim 11, further comprising calibrating the module to measure the characteristics of the load by means of software.

13. The method of claim 8, wherein the electrical load comprises an apparatus.

14. A method for monitoring an electrical load having a current and voltage requirement supplied by an electrical source coupled to the load, comprising:

interfacing a sensing module between the load and the electrical source for sensing one or more characteristics of the load;

combining a calibrating current or voltage signal with an electrical signal into a combined signal;

applying a mathematical transform to the combined signal in the sensing module;

measuring one or more characteristics of the load using the combined signal; and analyzing power-related anomalies and line disturbances of the electrical load; and validating the performance of the sensing of one or more characteristics of the load.

15. The method of claim 14, wherein applying a mathematical transform comprises applying a wavelet transform to the combined signal in the sensing module.

16. The method of claim 15, further comprising communicating the characteristics of the load to a remote station.

17. The method of claim 16, further comprising validating the performance of the load sensing by means of software.

18. A method for monitoring an apparatus connected to an electrical load having a current and voltage requirement supplied by an electrical source coupled to the apparatus and the load, comprising:

interfacing the apparatus between the load and the electrical source for sensing one or more characteristics of the apparatus;

combining a calibrating current or voltage signal with an electrical signal into a combined signal;

applying a mathematical transform to the combined signal in the sensing module;

measuring one or more characteristics of the apparatus using the combined signal; and determining the performance of the sensing of one or more characteristics of the apparatus.

19. The method of claim 18, wherein applying a mathematical transform comprises applying a wavelet transform to the combined current signal in the apparatus.

20. The method of claim 18, wherein the calibrating current signal is a tapered sinusoidal form with a characteristic attack, stationary, and decay periods of operating frequency greater than an order of magnitude of a line frequency of the apparatus.

* * * * *